(12) United States Patent
Ingraham

(10) Patent No.: US 7,802,490 B2
(45) Date of Patent: Sep. 28, 2010

(54) MULTIFUNCTION SEAT CONTROL APPARATUS AND METHOD

(75) Inventor: Derek Ingraham, Conroe, TX (US)

(73) Assignee: Kongsberg Automotive Holding ASA, Kongsberg (NO)

( * ) Notice: Subject to any disclaimer, the term of this patent is extended or adjusted under 35 U.S.C. 154(b) by 1177 days.

(21) Appl. No.: 11/267,268

(22) Filed: Nov. 7, 2005

(65) Prior Publication Data

US 2007/0062324 A1 Mar. 22, 2007

Related U.S. Application Data

(60) Provisional application No. 60/713,730, filed on Sep. 6, 2005.

(51) Int. Cl.
*G05G 1/08* (2006.01)
*B60N 2/02* (2006.01)

(52) U.S. Cl. .................. 74/505; 297/361.1; 297/331; 297/336; 297/1

(58) Field of Classification Search ......... 297/331–336, 297/61, 378.12; 74/505–507, 500.6, 501.6
See application file for complete search history.

(56) References Cited

U.S. PATENT DOCUMENTS

| | | | | |
|---|---|---|---|---|
| 5,681,079 A | * | 10/1997 | Robinson | 297/61 |
| 6,345,549 B1 | * | 2/2002 | Lance | 74/500.5 |
| 6,668,679 B2 | * | 12/2003 | McMillen | 74/500.5 |
| 7,097,202 B2 | * | 8/2006 | Levine | 280/735 |
| 7,118,171 B2 | * | 10/2006 | Fowler et al. | 297/61 |
| 2003/0085099 A1 | | 5/2003 | Liu | |

FOREIGN PATENT DOCUMENTS

| | | |
|---|---|---|
| DE | 10310424 A1 | 9/2004 |
| FR | 2 765 531 A1 | 1/1999 |

OTHER PUBLICATIONS

International Search Report mailed May 7, 2007 (2 pp.).

* cited by examiner

*Primary Examiner*—David Dunn
*Assistant Examiner*—Erika Garrett
(74) *Attorney, Agent, or Firm*—Baker & Hostetler LLP

(57) ABSTRACT

A multifunction seat control system includes a pulley mechanism in an enclosure, an actuation shaft to attach an external handle, and multiple latch actuation cables. The pulley mechanism includes multiple circumferential slots in which the cables ride, and cable-end entryways through which associated cables ends can be inserted. A lockout device detects a seat-back position to selectively limit the rotational travel of the pulley mechanism. The pulley mechanism is rotationally actuated to a predetermined angle to release a seat-back latch so the seat back can recline or fold forward, and beyond the predetermined angle to release seat-bottom latches so the seat can tumble into a stowage configuration. The control system optionally includes a headrest cable to release a headrest as the seat back is folded forward, and a release strap to actuate the pulley mechanism from behind the seat.

23 Claims, 6 Drawing Sheets

MULTIFUNCTION SEAT CONTROL APPARATUS AND METHOD

CROSS-REFERENCE TO RELATED APPLICATIONS

This application claims priority to provisional U.S. patent application entitled, "MULTIFUNCTION SEAT CONTROL APPARATUS AND METHOD," filed Sep. 6, 2005, having a Ser. No. 60/713,730, the disclosure of which is hereby incorporated by reference in its entirety.

FIELD OF THE INVENTION

The present invention relates generally to cable systems. More particularly, the present invention relates to manually-operated seat control systems using cables.

BACKGROUND

Vehicle seats often include a reclining seat back, as well as additional seat adjusting functions. For example, a vehicle seat may have a folding seat back that can fold forward, or the seat may be released to slide or roll forward, in order to facilitate entry into a rear seat in the vehicle. In some cases, the seat back may fold partially forward—for example, approximately 45 degrees—or the seat back may fold fully forward, such that the seat back is approximately parallel to the seat bottom or the vehicle floorboard.

Furthermore, some vehicle seats are designed to "tumble," fold, or collapse, for example, into a stowage configuration. For example, the seat bottom may be releasably attached to the floorboard at the rear by way of a latching mechanism, and hinged to the floorboard at the front, so that the seat back can fold fully forward, or down, and the seat assembly can be rotated forward into a stowage position. Other seats can be configured to fold down into a stowage cavity in the floorboard.

In order to facilitate such functionality, vehicle seats can include control mechanisms with handles on or near the seat. Generally, a vehicle seat may include a separate handle for each function—for example, one handle to allow the seat to recline, another handle to allow the seat back to fold forward, and another handle to allow the seat to tumble. However, multiple handles can be difficult to install in a vehicle seat, as well as inconvenient to operate, and can cause operator confusion.

Accordingly, it is desirable to provide a method and apparatus that can provide actuation for multiple vehicle seat functions with a single handle.

SUMMARY OF THE INVENTION

The foregoing needs are met, to a great extent, by the present invention, wherein in one aspect an apparatus is provided that in some embodiments can provide actuation for multiple vehicle seat functions with a single handle.

In accordance with one aspect of the present invention, a seat control system can include a pulley mechanism. The pulley mechanism can have a first cable slot that spans a first segment of a circumference of the pulley mechanism, and a transverse guide surface including a first segment, a second segment and a bend, wherein the first segment is nearer an axis of the pulley mechanism and is angled toward an actuation direction of rotation, the second segment is nearer the circumference of the pulley mechanism and is angled away from the actuation direction of rotation, and the first and second segments are connected by the bend.

In accordance with another aspect of the present invention, the seat control system can include means for rotationally actuating a pulley mechanism in an actuation direction and means for selectively actuating a first cable with the pulley mechanism based on the amount of tension initially sustained by the first cable. The seat control system can also include means for selectively limiting a rotational travel of the pulley mechanism to a predetermined angle based on a seat-back position and means for actuating a second cable when the pulley mechanism rotates in the actuation direction beyond the predetermined angle.

In accordance with yet another aspect of the present invention, the method of controlling a seat can include the steps of rotationally actuating a pulley mechanism in an actuation direction and selectively actuating a first cable with the pulley mechanism based on the amount of tension initially sustained by the first cable. The method can also include the steps of selectively limiting a rotational travel of the pulley mechanism to a predetermined angle based on a seat-back position and actuating a second cable when the pulley mechanism rotates in the actuation direction beyond the predetermined angle.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
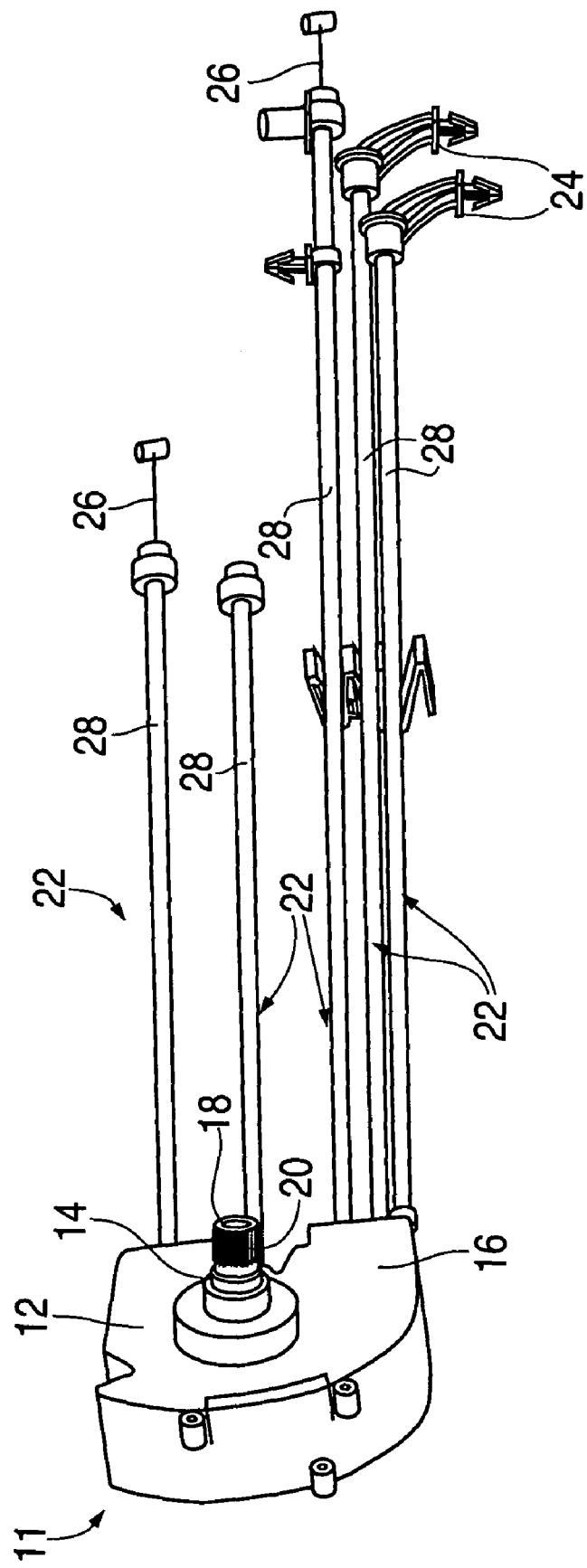
FIG. 1 illustrates a multifunction seat control system according to a preferred embodiment of the invention.

An embodiment in accordance with the present invention provides a manually-operated, cable-driven, multifunction seat control system that can provide actuation for multiple seat latches using a single pulley mechanism. The pulley mechanism can be attached to multiple latch actuation cables. For example, Bowden cables, in order to allow a seat, such as an vehicle seat, to be reclined, folded, and tumbled with a single handle. The handle can be moved in a sequence of synchronized motions to simultaneously or sequentially unlatch the various latch mechanisms required to recline, fold and tumble the seat. In an embodiment in accordance with the invention, the pulley mechanism can be actuated more then once in the same direction to sequentially permit the seat to recline or fold and tumble.

Some embodiments of the invention include a pulley mechanism that includes multiple circumferential slots that accept multiple cables. The pulley mechanism can further include one or more cable-end entryways associated with each slot, such as a round aperture leading into the slot, for example, at one end of the slot, through which a cable end can be inserted to introduce the associated cable into the slot.

The control systems in accordance with the invention can include multiple cables, such as Bowden cables, which can be attached to the pulley mechanism by way of the slots, such that when the pulley mechanism is rotated in one direction some of the cables can be retracted, and when the pulley mechanism is rotated in the opposite direction the same cables can be extended.

In some embodiments of the invention, one of the slots can open into an opening in the pulley mechanism that includes a generally radial guide surface over which a cable end can slide. The guide surface can include a bend relatively near the outer circumference of the pulley mechanism, beyond which the guide surface angles toward a cable-entry wall of the casing with respect to the guide surface radially inward of the bend. Similarly, the guide surface can angle away from the cable-entry wall before the bend.

Thus, the motion of the cable corresponding to the slot that opens at the guide surface can depend on the amount of tension in the cable. For example, if the cable is initially under tension, the cable end can slide radially outward along the guide surface, beyond the bend to an elbow at the outer end of the guide surface, which can engage and retract the cable as the pulley mechanism is rotated in an actuation direction from an initial position; whereas, if the cable is not initially under tension, the cable end can slide radially inward along the guide surface generally toward an axis of rotation of the pulley mechanism, which can cause the cable to not be retracted, or to be retracted to a lesser extent than if the cable were under tension and slid outward, as the pulley mechanism is rotated in the actuation direction. Thus, the actuation of this cable can depend on the amount of tension initially in the cable when rotation of the pulley mechanism is initiated.

Furthermore, the pulley mechanism can be configured to interface with an interlock tab, which can engage a stop surface on the pulley mechanism to limit rotation of the pulley mechanism. The interlock tab can be attached to a cable that can actuate the tab toward or away from the pulley, such that the interlock tab can be selectively actuated to at times limit and at other times not limit rotation of the pulley mechanism.

Illustrated systems and parts in accordance with some embodiments of the invention will now be described with reference to the drawing figures, in which like reference numerals refer to like parts throughout. An embodiment according to the invention is illustrated in FIG. 1, which illustrates a multifunction seat control system, including a seat control module 11. The seat control module 11 can include an enclosure, for example, a two-piece cast metal casing 12 such as that shown in FIG. 1. The casing 12 can include an orifice 14 in one side, or wall 16, to allow an actuation shaft 18 to protrude from the casing 12. The actuation shaft 18 can include an attachment interface, such as the splines 20 shown in FIG. 1, to provide for attachment of an external handle to the actuation shaft 18 and to transmit torque from the handle to the actuation shaft 18.

The multifunction seat control system can further include multiple latch actuation cables, such as the five sheathed Bowden cables 22 shown in FIG. 1. The cables can include an inner cable 26 and a coaxial outer sheath 28, so that opposing axial forces can be carried by the inner cable 26 and the outer sheath 28 in order to exert an actuation force on an external body. In one embodiment, two of the cables can attach to seat-bottom latching mechanisms 24, as shown in FIG. 1.

Figure 2:
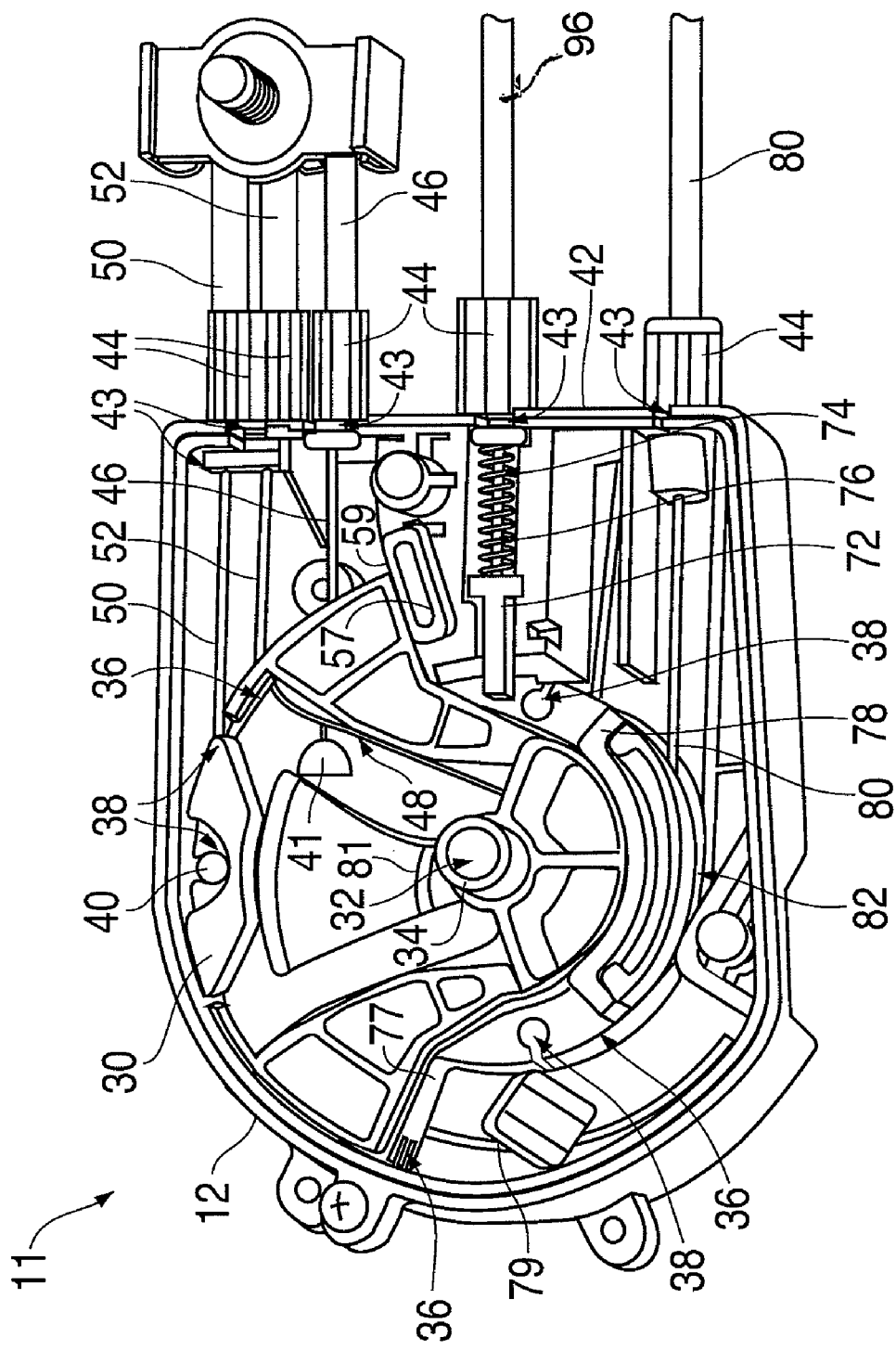
FIG. 2 is a cutaway perspective view of a seat control module of a type suitable for carrying out the functions of the multifunction seat control system of FIG. 1.

FIG. 2 illustrates the seat control module 11 from the opposite side and inverted with regard to FIG. 1, with the near side of the casing 12 removed to expose the inner workings of the seat control module 11. As shown in FIG. 2, the seat control module 11 can include a pulley mechanism 30, for example, a diecast metal pulley, configured to rotate about an axis 32 within the casing 12. The pulley mechanism 30 can include an integral shaft 34 that shares the same axis 32 and acts as an axle about which the pulley mechanism can rotate. In some embodiments, the integral shaft 34 can include an axial extension that forms the actuation shaft 18 seen protruding from the casing 12 in FIG. 1. The pulley mechanism 30 can also include multiple circumferential slots 36 into which the inner cables 26 (see FIG. 1) can be introduced.

For this purpose, the pulley mechanism 30 can further include multiple cable-end entryways 38, one or more of which can open into each of the slots 36 to allow a cable end 40 on each of the inner cables 26 to be inserted into the pulley mechanism 30 such that each of the inner cables 26 can ride in an individual slot 36 and an axial force can be exerted on each of the inner cables 26 by the pulley mechanism 30 as the pulley mechanism 30 rotates. To this end, the inner cables 26 include cable ends 40 attached to the end of each of the inner cables 26 to terminate the inner cables 26 and to provide an attachment mechanism by which the inner cables 26 can be coupled to the pulley mechanism 30.

In addition, the casing 12 can include a cable-entry wall 42 through which each of the cables 22 can pass from external to the casing 12 to the interior of the casing 12. For example, as shown in FIG. 2, the cable-entry wall 42 can include apertures 43 through which fittings 44 connected to one end of each of the outer sheaths 28 can pass. The fittings 44 can include fastening means, such as threads, to fasten the cables 22 to the casing.

In FIG. 2, four of the inner cables 26 are shown coupled to the pulley mechanism 30 by way of the slots 36 and cable-end entryways 38. For example, the multifunction seat control system shown in FIG. 2 can include a seat-back latch cable 46, a first seat-bottom latch cable 50 and a second seat-bottom latch cable 52.

Figure 3:
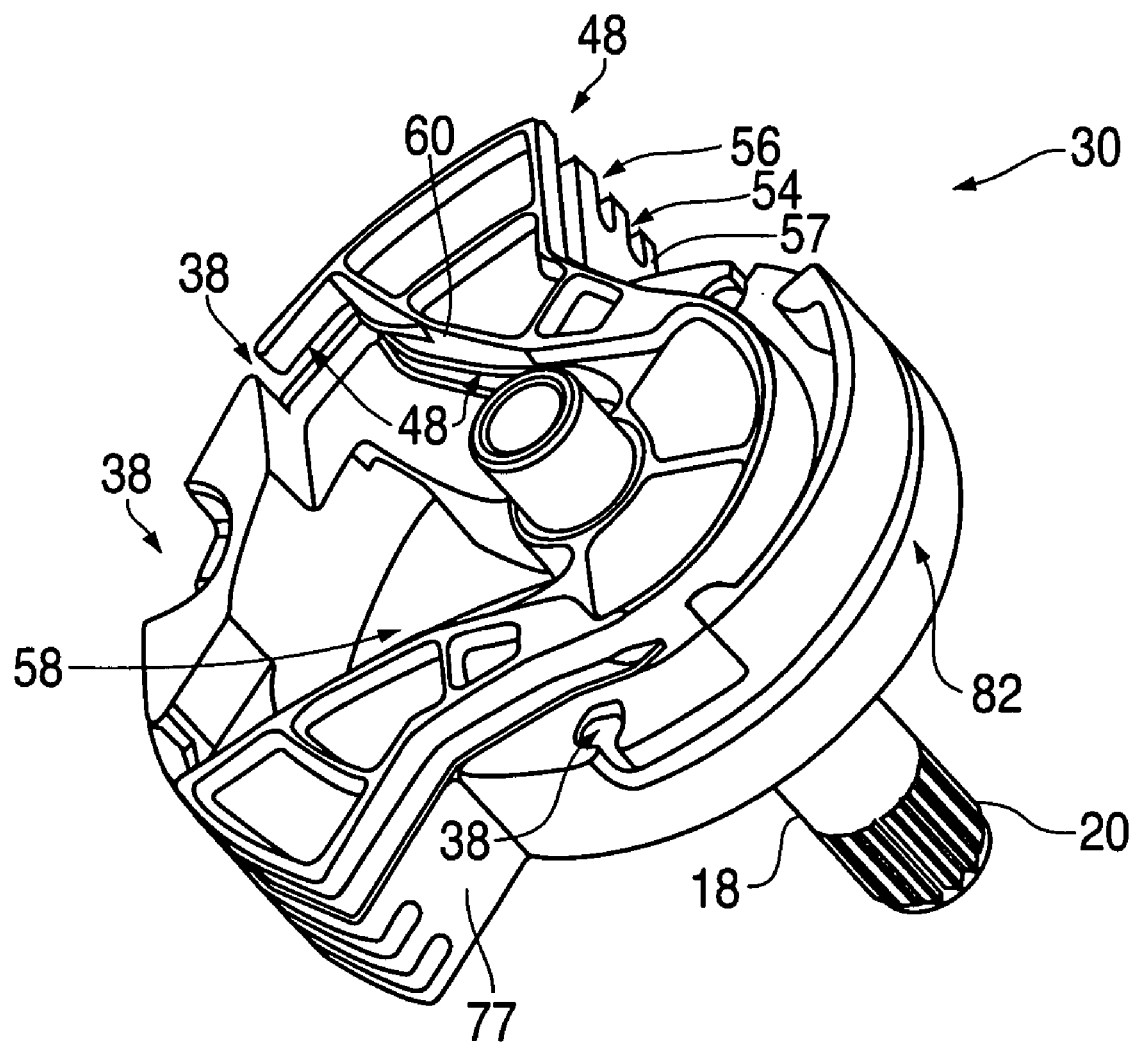
FIG. 3 is a perspective view of a pulley mechanism of a type suitable for use with the seat control module of FIG. 2.

As shown in FIG. 3, a first slot 48 in the pulley mechanism 30 can open into an opening 58 at a guide surface 60 that lies in a transverse plane with regard to the tangential direction of travel of the pulley mechanism 30. The first slot 48 and can generally be aligned with or roughly parallel to a radius of the pulley mechanism 30.

Figure 4:
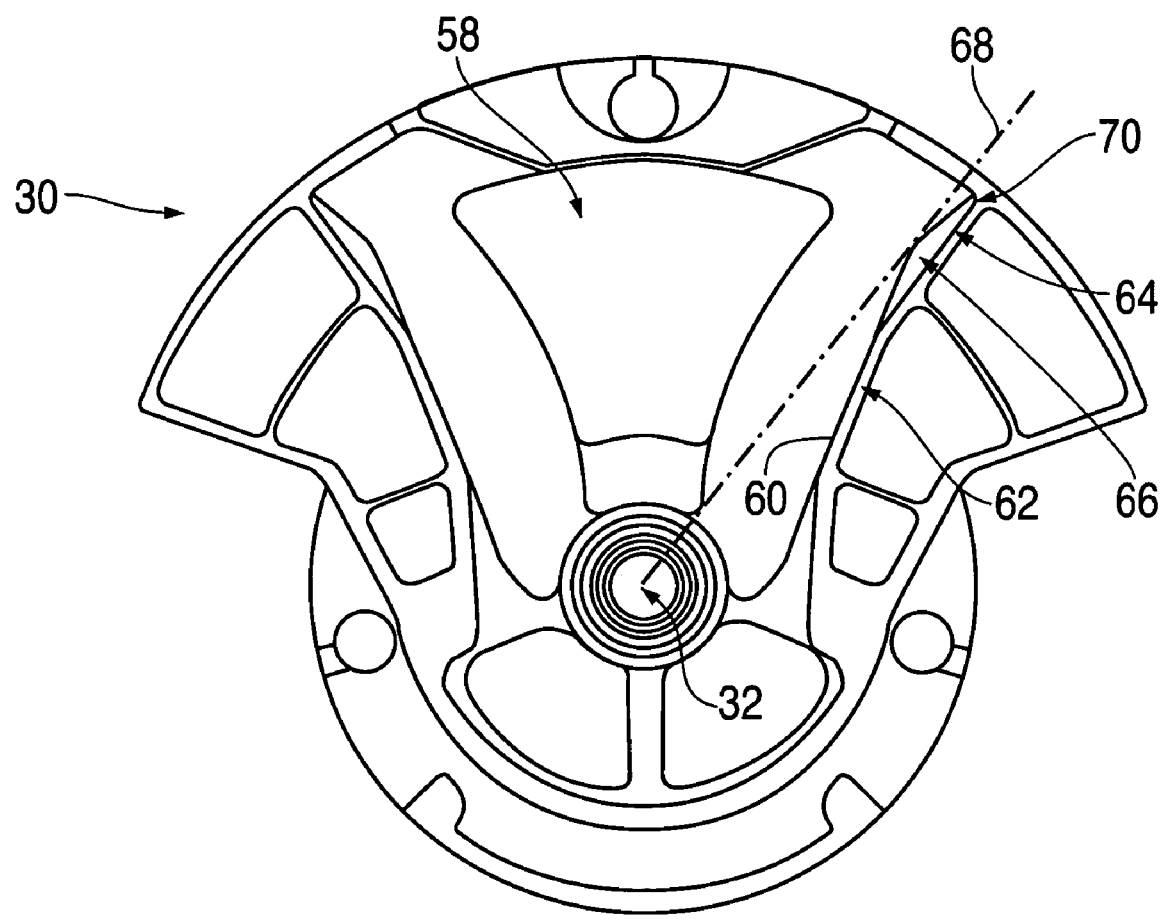
FIG. 4 is a side detail view of the pulley mechanism of FIG. 3.

FIG. 4 shows a side detail view of the pulley mechanism 30. As shown in FIG. 4, the guide surface 60 can include a first segment 62 and a second segment 64 that are connected by a knee, or bend 66, in the guide surface 60. With respect to a radius 68 of the pulley mechanism 30 that originates at the axis of rotation 32 and is tangential to the bend 66 of the guide surface 60, the first segment 62, extending from a point relatively near the axis 32 toward the bend 66, can angle toward the actuation direction of travel (away from the cable-entry wall 42 shown in FIG. 2). Outward of the bend 66, the second segment 64 can angle away from the actuation direction of travel (toward the cable-entry wall 42).

Moreover, the seat-back latch cable 46 (see FIG. 2) can ride in the first slot 48, which is shown in FIG. 3. The corresponding cable end 40 (see FIG. 2) which in some embodiments can include a generally rounded surface, can interface with the guide surface 60. Moreover, as illustrated in FIG. 4, the bend 66 can be located such that, with the pulley mechanism 30 at the initial position, the bend 66 is generally aligned with the seat-back latch cable 46 (refer to FIG. 2). As a result, as the pulley mechanism 30 rotates in the actuation direction from the initial position, the seat-back latch cable 46 can slide either inward along the first segment 62 or outward along the second segment 64 of the guide surface 60 (refer to FIG. 4), depending on the amount of tension in the seat-back latch cable 46 when rotation begins.

Thus, in operation, the actuation of the seat-back latch cable 46 (see FIG. 2) can depend on the amount of tension initially in the seat-back latch cable 46 when rotation of the pulley mechanism 30 is initiated. For example, if the seat-back latch cable 46 is initially under tension, the cable end 40 (see FIG. 2) can slide radially outward along the guide surface 60 of FIG. 4, beyond the bend 66 to a "V"-shaped elbow 70 at the outer extreme of the guide surface 60. In this case, the elbow 70 can engage the cable end 40 of the seat-back latch cable 46 to retract the cable into the casing 12 as the pulley mechanism 30 rotates in the actuation direction (counterclockwise in FIGS. 2, 3 and 4).

Conversely, if the seat-back latch cable 46 (see FIG. 2) is not initially under tension, the cable end 40 (shown in FIG. 2) can slide radially inward along the guide surface 60 of FIG. 4, generally toward the axis 32 of the pulley mechanism 30. In this latter case, the elbow 70 can not engage or can lightly engage the cable end 40 of the seat-back latch cable 46, and the seat-back latch cable 46 can be not retracted, or can be retracted to a lesser extent than if the seat-back latch cable 46 were initially under tension and slid outward, as the pulley mechanism 30 rotates in the actuation direction (counterclockwise in FIGS. 2, 3 and 4).

Returning now to FIG. 2, the seat control module 11 can further include an interlock tab 72, which can be coupled to the end of an interlock cable 74 inside the casing 12. In addition, a resilient body, such as the coaxial spring 76 shown in FIG. 2, can exert a bias force on the interlock tab 72 to urge the tab 72 toward the pulley mechanism 30.

Correspondingly, the pulley mechanism 30 can include a stop surface 78, which can be integral to the pulley mechanism 30 or can be separate but fixedly attached to the pulley mechanism 30 as shown in FIG. 2. The stop surface 78 can be configured such that, when the interlock tab 72 is extended toward the pulley mechanism 30, the stop surface 78 contacts the interlock tab 72 at a predetermined rotational angle of the pulley mechanism 30 to prevent further rotation of the pulley mechanism in the actuation direction (counterclockwise in FIG. 2). For example, in one embodiment the predetermined rotational angle of the pulley mechanism 30 can be approximately 35 degrees in the actuation direction from an initial or center position.

The opposite end of the interlock cable 74 can be coupled to a seat-back position detection device that allows the interlock cable 74 to be retracted toward in the interior of the casing 12 when an associated seat back is in an upright position or a partially upright position, and actuates the interlock cable 74 toward the exterior of the casing 12, for example, when the seat back is folded substantially fully forward. Thus, in operation, the interlock tab 72 can prevent rotation of the pulley mechanism 30 beyond a predetermined rotational angle in the actuation direction (counterclockwise in FIG. 2) when the seat back is upright, and allow further rotation of the pulley mechanism 30 beyond the predetermined rotational angle in the actuation direction (counterclockwise in FIG. 2) when the seat back is folded down. In addition, a stop surface, such as the shoulder 77, can contact a fixed final stop 79 to limit the overall rotation of the pulley mechanism 30 in the actuation direction.

In addition, the first seat-bottom latch cable 50 can ride, for example, in a second slot 54, shown in FIG. 3, and the second seat-bottom latch cable 52 can ride, for example, in a third slot 56, also shown in FIG. 3. Furthermore, as illustrated in FIG. 2, the cable ends 40 of the first and second seat-bottom latch cables 50, 52 can be engaged by the cable-end entryways 38 of the second and third slots 54, 56, respectively—or by additional cable-end stops (not shown) in other locations within the slots 52, 54—in order to cause the first and second seat-bottom latch cables 50, 52 to be retracted (drawn inward toward the interior of the casing 12) as the pulley mechanism 30 is rotated in an actuation direction (counterclockwise in FIG. 2) from an initial position. A stop surface, such as the shoulder 57 of the pulley mechanism 30, can contact a fixed stop 59, which, for example, can be integral to or attached to the casing 12, in order to prevent the pulley mechanism 30 from rotating opposite the actuation direction beyond the initial position. In some embodiments, the pulley mechanism 30 can be biased toward the initial position, for example, by a coil spring 81 that engages the pulley mechanism 30 and the casing 12.

The first and second seat-bottom latch cables 50, 52 can be similarly extended (pushed by the pulley mechanism 30 or drawn by an external body toward the exterior of the casing) as the pulley mechanism 30 is rotated opposite the actuation direction (counterclockwise in FIG. 2). The first and second seat-bottom latch cables 50, 52 can be coupled to seat-bottom latches 24 (shown in FIG. 1) at their opposite ends. Thus, in operation, the seat-bottom latches 24 can be released, or unlatched, as the pulley mechanism 30 is actuated in the actuation direction (counterclockwise in FIG. 2), and can be allowed to latch as the pulley mechanism 30 rotates in the opposite direction.

Moreover, the multifunction seat control system can include a release cable 80, as shown in FIG. 2. The release cable 80 can ride, for example, in a fourth slot 82 (see also FIG. 3) in the pulley mechanism 30. The associated cable end 40 (not visible in FIG. 2) of the release cable 80 can be inserted through and engaged by the corresponding cable-end entryway 38, such that the pulley mechanism 30 can be rotationally actuated by the release cable 80. Alternatively, the cable end 40 can be engaged by an additional cable-end stop (not shown) at another location within the slot 82.

Thus, the pulley mechanism 30 can be actuated in the actuation direction (counterclockwise in FIG. 2) by the release cable 80. Accordingly, the release cable 80 can optionally be used to actuate the pulley mechanism 30 instead of an external handle. That is, either the actuation shaft 18 can be manually actuated by an external handle or the release cable 80 can be manually actuated in order to rotationally actuate the pulley mechanism 30 in the actuation direction (counter-clockwise in FIG. 2).

In some embodiments, the pulley mechanism 30 can be symmetrically configured, as shown in FIG. 2, such that two halves (left and right in FIG. 4) of the pulley mechanism 30 form substantial mirror images of each other. As a result, the pulley mechanism 30 can be installed in a reverse-configured casing (not shown) with a cable-entry wall on the opposite end of the casing, and the resulting reverse control system can be utilized in a reverse configuration, for example, on an opposite side of a seat (for example, on a passenger-side seat instead of a driver-side seat). Thus, a single pulley mechanism 30 design can be used for various vehicle seat configurations.

Figure 5:
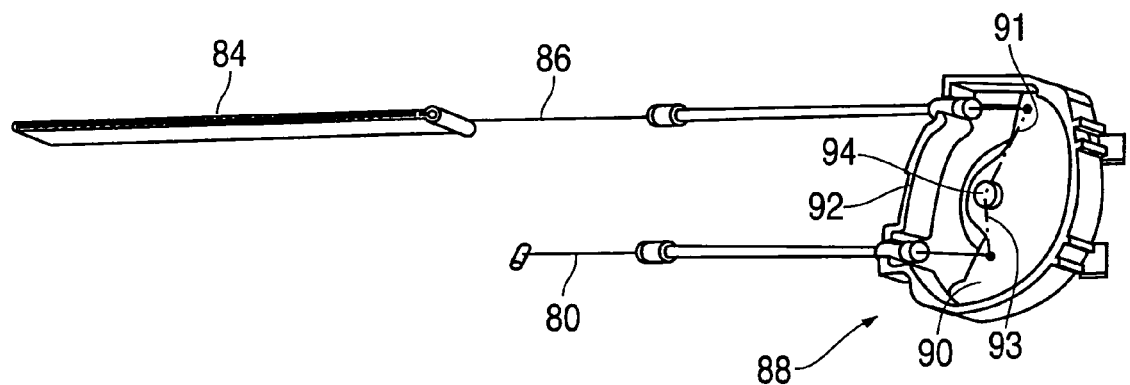
FIG. 5 illustrates a representative mechanical advantage device of a type suitable for use in an embodiment of the invention.

FIG. 5 illustrates a release strap 84 that in some embodiments can be attached to the opposite extreme of the release cable 80 (refer to FIG. 2) to facilitate manual actuation of the release cable 80, or in one embodiment can be attached to a distal end of a remote release cable 86, as shown in FIG. 5. The release strap 84 can be located, for example, at the rear of the vehicle seat to provide convenient access to an operator seated in a posterior seat. In the embodiment shown in FIG. 5, the proximal end of the remote release cable 86 can be coupled to a mechanical advantage device, such as the effort reduction device 88 shown in FIG. 5. For example, the effort reduction device 88 can include an effort reduction pulley 90 in an enclosure 92. The remote release cable 86 can be coupled to the pulley 90 at a relatively large radial distance 91 from the pulley axis of rotation 94, for example, near the outer circumference of the pulley 90, as shown in FIG. 5.

An opposite end of the release cable 80 (i.e., opposite the end attached to the pulley mechanism 30, as shown in FIG. 2) can also be coupled to the effort reduction pulley 90, but at a relatively small radial distance 93 from the pulley axis of rotation 94, as compared to the radial distance 91 of the remote release cable 86 connection. Thus, in operation, the release strap 84 can be manually pulled to actuate the remote release cable 86, and the release cable 80 is in turn actuated by way of the effort reduction pulley 90 with a greater force than that applied to the release strap 84. For example, in one embodiment the large radial distance 91 can be approximately three times the length of the small radial distance 93, so that three times the manual force applied to the release strap 84 is applied to the release cable 80.

Figure 6:
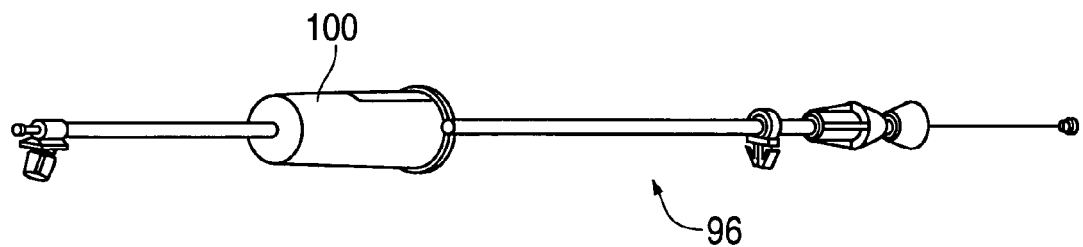
FIG. 6 illustrates a representative headrest cable and compensator of a type suitable for use in an embodiment of the invention.

In addition, the multifunction seat control system can optionally include a headrest cable 96, such as that shown in FIG. 6. The headrest cable 96 can be coupled at one end to a headrest latch and at the opposite end to a seat-back position detection device, such as the lockout device 98 shown in FIG. 7. Thus, in operation, when the seat back is folded substantially fully forward, or optionally if the seat back is folded partially forward, the headrest cable 96 can be actuated by the seat-back position detection device in order to release, or unlatch, the headrest latch. For example, in one embodiment, the headrest cable 96 can be actuated to unlatch the headrest latch when the seat back reaches a forward angle of approximately 40 degrees.

As shown in FIG. 6, the headrest cable 96 can optionally include a compensator 100 that can limit the axial force that can be transmitted by way of the headrest cable 96. For example, in some embodiments the compensator 100 includes a resilient device, such as a coil spring, coupled between two segments of the headrest cable 96 that can deform at or above a predetermined axial force in order to relieve the headrest cable 96 from increased axial tension.

Figure 7:
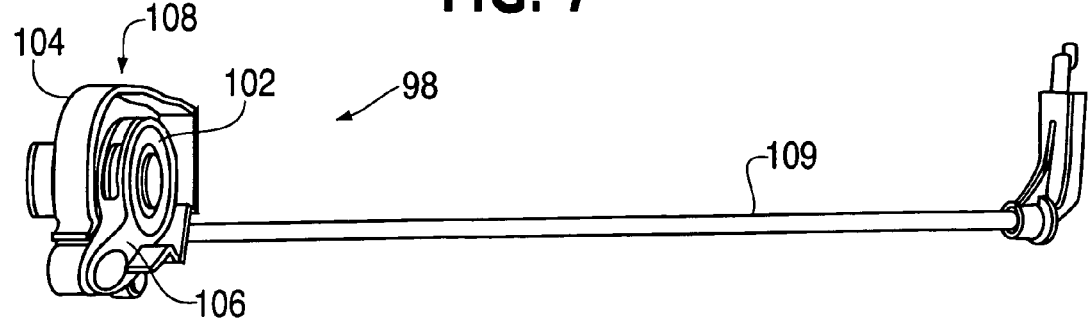
FIG. 7 illustrates a representative seat-back position detection device of a type suitable for use in an embodiment of the invention.

As alluded to above, the multifunction seat control system can further include a seat-back position detection device, such as the lockout device 98 shown in FIG. 7 (with one side open in order to illustrate the inner workings of the lockout device 98). The lockout device 98 can include a lockout pulley 102 in an enclosure 104, and a lever arm 106 extending from the lockout pulley 102 through an opening 108. The opposite end of the lever arm 106 can be coupled to the seat back in order to detect the seat back position and receive an actuation force when the seat back is reclined or folded forward.

In addition, in one embodiment of the multifunction seat control system, the lockout device 98 can receive the opposite end of the interlock cable 74 (shown in FIG. 2), which can be coupled to the lockout pulley 102 such that the interlock cable 74 is actuated toward the lockout device 98 and (away from the seat control module 11) when the seat back is folded fully forward, or optionally when the seat back is folded partially forward. Thus, the interlock tab 72 can be actuated in a direction away from the pulley mechanism 30 when the seat back is folded down, in order to allow the pulley mechanism 30 rotate beyond the predetermined rotational angle when the seat back is folded down.

Furthermore, the lockout device 98 can also receive a seat-bottom latch cable 109 that can directly unlatch an additional (third) seat-bottom latch as the seat back is folded forward. Moreover, the lockout device 98 can receive a headrest latch cable 96, such as that shown in FIG. 6, which can be coupled to the pulley 102 to also actuate the headrest cable 96 when the seat back is folded forward.

Figure 8:
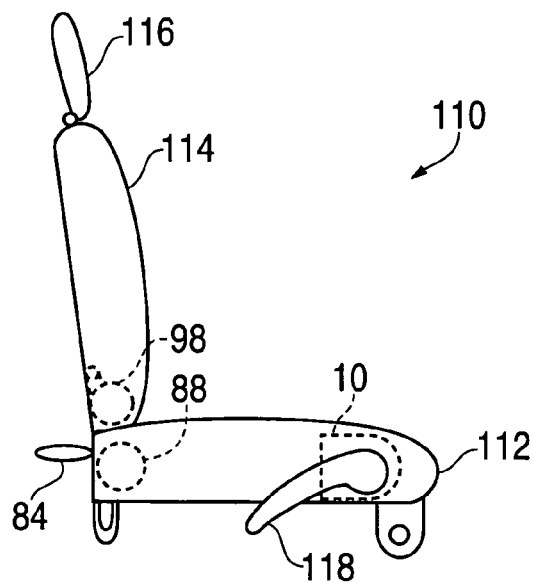
FIG. 8 illustrates a representative vehicle seat with an embodiment of the invention installed.

FIG. 8 illustrates a vehicle seat 110 in an upright position with an embodiment of the multifunction seat control system installed. (For purposes of illustrating the seat functionality enabled by an embodiment of the present invention, the interconnecting cables and latches are not shown.) The vehicle seat 110 can include, for example, a seat bottom 112, a seat back 114 and a headrest 116. In addition, a seat control module 11, an effort reduction device 88 and a lockout device 98 can be installed in the vehicle seat 110.

Furthermore, as illustrated in FIG. 8, an external handle 118 and a release strap 84 can be installed external to the seat and coupled to the seat control module 11. In FIG. 8, the external handle 118 is shown at an initial position that corresponds to the initial position of the pulley mechanism 30 at which the pulley mechanism shoulder 57 contacts the fixed stop 59 (see FIG. 2). At the initial position, a seat-back latch and seat-bottom latches (not shown) can be, for example, in a latched position.

Figure 9:
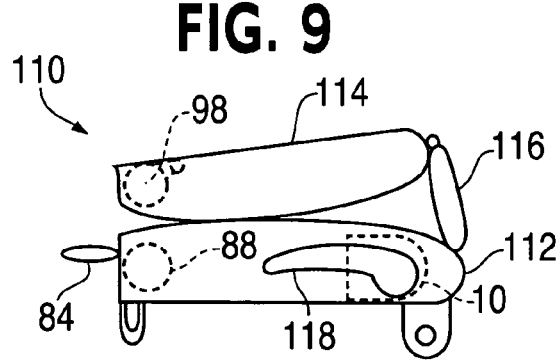
FIG. 9 illustrates the vehicle seat of FIG. 8 with the seat back folded forward and the headrest folded down.

FIG. 9 illustrates the vehicle seat 110 with the seat back 114 and the headrest 116 folded fully forward, or down. The external handle 118 is shown at an intermediate position that corresponds to the predetermined rotational angle of the pulley mechanism 30 at which the stop surface 78 contacts the interlock tab 72 (refer to FIG. 2). At the intermediate handle position, a seat-back latch can be, for example, unlatched to allow the seat back 114 to be reclined or folded forward.

Figure 10:
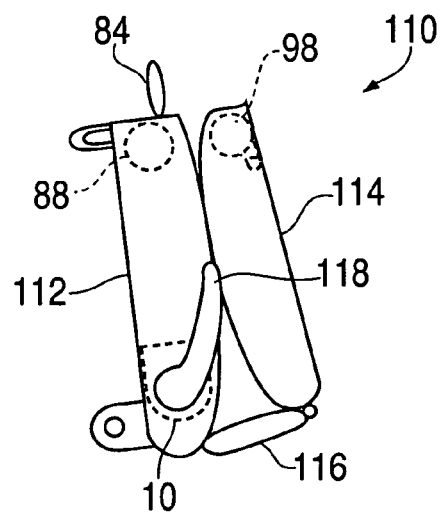
FIG. 10 illustrates the vehicle seat of FIG. 8 tumbled into a stowage configuration.

FIG. 10 illustrates the seat 110 tumbled in a stowage configuration, with the seat back 114 and the headrest 116 folded forward and the seat bottom 112 rotated into a vertical position. The external handle 118 is shown at a terminal position that corresponds to a rotational angle of the pulley mechanism 30 that is greater than, or beyond, the predetermined rotation angle determined by the interlock tab 72 and corresponding stop surface 78 (see FIG. 2). At the terminal handle position, the seat-bottom latches can be, for example, unlatched to allow the seat bottom 112 to be tumbled into the stowage configuration.

In operation, beginning with the seat back in an upright position as shown in FIG. 8, the handle 118 or the release strap 84 can be actuated to rotate the pulley mechanism 30 (see FIG. 2) of the seat control module 11 in an actuation direction (clockwise in FIG. 8) from an initial position until the stop surface 78 contacts the interlock tab 72 (refer to FIG. 2) at a predetermined rotational angle, which corresponds to the intermediate position of the handle (shown in FIG. 9).

As the pulley mechanism 30 rotates in the actuation direction from the initial position, tension in the seat-back latch cable 46 (see FIG. 2) can cause the associated cable end 40 to slide outward along the guide surface 60 (refer to FIG. 4) until the cable end 40 is engaged by the elbow 70 at the outer extreme of the guide surface 60. Then, the pulley mechanism 30 can actuate the seat-back latch cable 46, which can be retracted to release, or unlatch, a seat-back latch, allowing the seat back 114 to be reclined or folded forward, as shown in FIG. 9.

As the seat back 114 is folded forward, the interlock device 98 can actuate the headrest cable 96 (see FIG. 6) to unlatch a headrest latch (not shown), allowing the headrest 116 to fold down, as shown in FIG. 9. In some embodiments, the interlock device 98 can also actuate a third seat-bottom latch cable 109 (see FIG. 7) to unlatch one or more seat-bottom latches (not shown). The second and third slots 54, 56 (see FIG. 3) of the pulley mechanism 30 can be configured so that additional seat-bottom latches (not shown) are not released, or unlatched, before or at the predetermined rotational angle, so the vehicle seat 110 can remain in the fully folded forward position, as shown in FIG. 9.

In addition, if the seat back is folded substantially fully forward, the interlock device 98 can actuate the interlock cable 74 (see FIG. 2), which can pull the interlock tab 72 away from the pulley mechanism 30. With the interlock tab 72 pulled away from the pulley mechanism 30, the handle 118 or the release strap 84 can further actuate the pulley mechanism 30 in the actuation direction (clockwise in FIG. 9) beyond the predetermined rotational angle to the terminal position, shown in FIG. 10.

The second and third slots 54, 56 (see FIG. 3) of the pulley mechanism 30 can further be configured to actuate the first and second seat-bottom latch cables 50, 52 (refer to FIG. 2) into the seat control module 11 as the pulley mechanism 30 rotates beyond the predetermined rotational angle. The first and second seat-bottom latch cables 50, 52 can release, or unlatch, two or more additional seat-bottom latches (not shown) that hold the seat bottom 112 against the vehicle floorboard. Thus, the vehicle seat 110 can be tumbled, for example into a stowage position, as shown in FIG. 10.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A seat control system, comprising:
a pulley mechanism;
a first cable slot that spans a first circumferential segment of a circumference of the pulley mechanism;
a guide surface which intersects said circumference, including a first segment, a second segment and a bend, wherein the first segment is nearer a radial of the pulley mechanism and is angled toward an actuation direction of rotation, the second segment is nearer the circumference of the pulley mechanism and is angled away from the actuation direction of rotation, and the first and second segments are connected by the bend, wherein the bend is located at a radial distance from the radial of the pulley mechanism such that when the pulley mechanism is rotated in the actuation direction from an initial position with a first cable initially not under substantial tension and a first cable end slides inward toward the axis of the pulley mechanism and does not actuate the first cable
a first cable-end entryway by which the first cable can be introduced into the first cable slot, wherein the first cable has a first cable end which is inserted through the first cable-end entryway so that the first cable rides in the first cable slot and the first cable end interfaces with the guide surface.

2. The seat control system of claim 1, wherein the first slot further opens into the guide surface forming a longitudinal opening that bifurcates the guide surface.

3. The seat control system of claim 1, wherein the first cable end is rounded to permit the first cable end to slide along the guide surface.

4. The seat control system of claim 1, further comprising an elbow at an outer extreme of the second segment to engage the first cable end.

5. The seat control system of claim 4, wherein the bend is located at a radial distance from the axis of the pulley mechanism such that when the pulley mechanism is rotated in an actuation direction from an initial position with the first cable initially under substantial tension the first cable end slides outward away from the axis of the pulley mechanism and the elbow engages the first cable end and actuates the first cable.

6. The seat control system of claim 5, further comprising a seat latch coupled to the first cable, wherein the first cable actuates the seat latch when the first cable is actuated.

7. The seat control system of claim 1, wherein the first segment is relatively parallel to a radius of the pulley mechanism with relation to the second segment.

8. The seat control system of claim 1, wherein two halves of the pulley mechanism divided by a radius of the pulley mechanism are symmetrical so that the pulley mechanism can be installed in a reverse configuration with an opposite actuation direction.

9. The seat control system of claim 1, further comprising:
an interlock tab;
a spring that biases the interlock tab toward an extended position at which the interlock tab limits a rotational travel of the pulley mechanism to a predetermined angle; and
an interlock cable that selectively retracts the interlock tab to allow the pulley mechanism to rotate beyond the predetermined angle.

10. The seat control system of claim 1, further comprising:
a second cable slot that spans a second segment of the circumference of the pulley mechanism; and a second cable-end entryway by which a second cable can be introduced into the second slot, wherein the entryway engages and actuates the second cable.

11. The seat control system of claim 10, further comprising a seat latch coupled to the second cable, wherein the second cable actuates the seat latch when the pulley mechanism rotates in the actuation direction beyond the predetermined angle.

12. The seat control system of claim 10, further comprising:
a third cable slot that spans a third segment of the circumference of the pulley mechanism; and
a third cable-end entryway by which a third cable can be introduced into the third slot, wherein the entryway engages and actuates the third cable.

13. The seat control system of claim 12, further comprising a seat latch coupled to the third cable, wherein the third cable actuates the seat latch when the pulley mechanism rotates in the actuation direction beyond the predetermined angle.

14. The seat control system of claim 13, further comprising:
a fourth cable slot that spans a fourth segment of the circumference of the pulley mechanism; and
a fourth cable-end entryway by which a release cable can be introduced into the fourth slot, wherein the entryway is engaged and actuated by the release cable to rotate the pulley mechanism in the actuation direction.

15. The seat control system of claim 14, further comprising:
an effort reduction device that includes an effort reduction pulley coupled to an opposite end of the release cable at a relatively small radial distance from an axis of the effort reduction pulley;
a remote release cable coupled to the effort reduction pulley at a relatively large radial distance from the axis of the effort reduction pulley; and
a release strap coupled to an opposite end of the remote release cable to facilitate actuation of the pulley mechanism from a remote location.

16. The seat control system of claim 1, further comprising:
a lockout device that includes a lockout pulley;
a lever arm attached to the lockout pulley that rotationally actuates the lockout pulley in response to a seat-back position detection device;
a fourth cable coupled to the lockout pulley; and
a seat latch coupled to the fourth cable, wherein the lockout pulley engages and actuates the fourth cable, and the fourth cable actuates the seat latch when a rotational angle of the lockout pulley corresponds to a predetermined seat-back position.

17. The seat control system of claim 1, further comprising:
a headrest latch cable coupled to the lockout pulley; and
a headrest latch coupled to the headrest latch cable, wherein the lockout pulley engages and actuates the headrest latch cable, and the headrest latch cable actuates the headrest latch when a rotational angle of the lockout pulley corresponds to a predetermined seat-back position.

18. The seat control system of claim 17, further comprising a compensator that limits an axial force applied to the headrest latch cable.

19. The seat control system of claim 1, further comprising:
an integral shaft extending along an axis of the pulley mechanism that facilitates rotational actuation of the pulley mechanism; and
a handle coupled to the integral shaft that facilitates manual actuation of the pulley mechanism.

20. The seat control system of claim 1, further comprising:
a casing that encloses the pulley mechanism; and
a seat coupled to the casing.

21. A seat control system, comprising:
means for rotationally actuating a pulley mechanism in an actuation direction;
means for selectively actuating a first cable with the pulley mechanism based on the amount of tension initially sustained by the first cable;
means for selectively limiting a rotational travel of the pulley mechanism to a predetermined angle based on a seat-back position; and
means for actuating a second cable when the pulley mechanism rotates in the actuation direction beyond the predetermined angle.

22. The seat control system of claim 21, further comprising:
means for detecting a seat-back position;
means for rotationally actuating a lockout pulley in response to the detected seat-back position; and
means for actuating a seat latch when a rotational angle of the lockout pulley corresponds to a predetermined seat-back position.

23. The seat control system of claim 22, further comprising means for actuating a headrest latch when a rotational angle of the lockout pulley corresponds to the predetermined seat-back position.

* * * * *